United States Patent [19]

Pelgrims et al.

[11] Patent Number: 5,653,950
[45] Date of Patent: Aug. 5, 1997

[54] PROCESS FOR PRODUCING ABRASION-RESISTANT SODIUM PERBORATE MONOHYDRATE WITH HIGH BULK DENSITY AND HIGH RATE OF SOLUTION

[75] Inventors: Ivan Pelgrims, Kontich, Belgium; Claas-Juergen Klasen, Freigericht, Germany

[73] Assignee: Degussa Aktiengesellschaft, Frankfurt am Main, Germany

[21] Appl. No.: 646,455

[22] Filed: May 8, 1996

[30] Foreign Application Priority Data

May 10, 1995 [DE] Germany ............ 195 16 609.4

[51] Int. Cl.⁶ .................................. C01B 15/12
[52] U.S. Cl. ................................ 423/281; 423/279
[58] Field of Search ........................... 423/279, 281

[56] References Cited

U.S. PATENT DOCUMENTS

| | | | |
|---|---|---|---|
| 4,115,519 | 9/1978 | Brichard et al. | 423/279 |
| 4,185,960 | 1/1980 | Brichard et al. | 423/281 |
| 4,215,097 | 7/1980 | Brichard et al. | 423/279 |
| 5,094,827 | 3/1992 | Bertsch-Frank et al. | 423/279 |
| 5,229,092 | 7/1993 | Dugua | 423/279 |
| 5,395,602 | 3/1995 | Herzig et al. | 423/279 |

FOREIGN PATENT DOCUMENTS

| | | |
|---|---|---|
| 0573797 | 12/1993 | European Pat. Off. |
| 2258319 | 4/1978 | Germany. |
| 2813326 | 10/1978 | Germany. |
| 2650225 | 4/1986 | Germany. |
| 3941851 | 6/1991 | Germany. |

OTHER PUBLICATIONS

*International Standard* Publication, ISO 5937–1980(E), First Edition —Nov. 1, 1980, entitled, "Sodium perborates for industrial use —Determination of degree of attrition," by the International Organization For Standardization.

*International Standard* Publication, ISO 3424–1975(E), First Edition –Nov. 1, 1975, entitled, "Sodium perborates for industrial use –Determination of bulk density," by the International Organization For Standardization.

Journal of Crystal Growth, Sep. 1989, published in the Netherlands, The Growth and Dissolution of Sodium Perborate Crystals in a Fluidized Bed Crystallizer, pp. 375–386.

*Primary Examiner*—Wayne Langel
*Attorney, Agent, or Firm*—Beveridge, DeGrandi, Weilacher & Young, L.L.P.

[57] ABSTRACT

Sodium perborate monohydrate having an $O_a$ content of 14 to 16%, a bulk density of at least 600 g/l, an abrasion index (ISO 5937) of less than 8%, and a specific surface of less than 5 m²/g can be produced by a fluidized bed—spraying process by spraying a sodium perborate solution produced by combining and mixing an aqueous hydrogen peroxide solution with an aqueous sodium metaborate solution, whereby the contact time between the combination of the solutions and the spraying is at least 2 seconds and preferably at least 5 seconds.

13 Claims, 1 Drawing Sheet

PROCESS FOR PRODUCING ABRASION-RESISTANT SODIUM PERBORATE MONOHYDRATE WITH HIGH BULK DENSITY AND HIGH RATE OF SOLUTION

INTRODUCTION TO THE INVENTION

The present invention is directed toward a process for producing sodium perborate monohydrate in the form of a granulation which simultaneously exhibits high active oxygen content, high resistance to abrasion, high bulk density and a high rate of solution.

Various processes are known for producing sodium perborate monohydrate, having the formula $NaBO_3 \cdot H_2O$. The material properties of the sodium perborate monohydrate depend largely on the process used.

One processing principle used industrially is based on the conversion of sodium metaborate with hydrogen peroxide in the aqueous phase, and crystallization of the sodium perborate tetrahydrate. Subsequently, the sodium perborate tetrahydrate is dehydrated to sodium perborate monohydrate in a fluidized bed.

The sodium perborate monohydrate produced by the crystallization process with subsequent dehydration, of the type mentioned above, has a satisfactory active oxygen content ($O_a$) of about 15–16%. The morphology of the monohydrate is primarily determined by the agglomeration of primary crystals. The crystal structure produces, on one hand, the desired high rate of solution, but on the other hand a relatively low bulk density (generally below 600 g/l) and often suffers from high abrasion, which can cause problems with pneumatic conveying. The abrasion problem, but not the bulk density, can be improved by special conditions during the dehydration, such as adjusting the relative humidity of the drying air to 40–80% (German Patent No. 22 58 319). The bulk density can indeed by improved by roll compaction of the sodium perborate monohydrate obtained in this manner without significantly reducing the rate of solution, but this step makes the whole process considerably more expensive.

Another processing principle for producing sodium perborate monohydrate, which gives a product with good abrasion resistance, consists of introducing an aqueous hydrogen peroxide solution and an aqueous sodium metaborate solution, or a mixture of the solutions, into a fluidized bed containing nuclei having dimensions smaller than that of the product to be produced, and evaporating the water introduced (German Patent No. 26 50 225).

The structure of the sodium perborate monohydrate produced by the fluidized bed process mentioned above is essentially spherical and dense. In spite of satisfactory $O_a$ content and high resistance to abrasion, products made by this processing principle have a disadvantage for the applications technology, in that the rate of solution is substantially reduced in comparison with products obtained by crystallization. As a result, release of the active oxygen from the sodium perborate monohydrate is delayed when these products are used as laundry bleach components in the washing liquid. In order to remedy this disadvantage, a surface-active agent is included in the $H_2O_2$ or metaborate solution sprayed into the fluidized bed, according to German Laid-Open Patent Application No. 28 13 326 (supplement to the above-mentioned German Patent No. 26 50 225). That can, to be sure, reduce the time for dissolution, but the process cannot achieve the short solution times known for the monohydrate obtained from sodium perborate monohydrate (less than 2 minutes for 95% dissolved material).

In German Laid-Open Patent Application No. 28 13 326, page 9, examples of monohydrate granulations with and without addition of tensides are listed, with their dissolution times. The dissolution time was measured conductometrically at 15° C., and is 15 minutes for 95% dissolved material.

German Patent No. 39 41 851 teaches a process for producing sodium perborate monohydrate having an active oxygen content of 14–16% by weight, an abrasion index of not more than 10%, as measured according to ISO 5937, and a dissolution time of less than 1.5 minutes. The process involves a roll compaction of essentially amorphous, very finely divided sodium perborate monohydrate produced by spray-drying.

SUMMARY OF THE INVENTION

The objective of the invention, then, is to provide an improved process for producing sodium perborate monohydrate in the form of a granulation with the combination of properties:

(a) active oxygen content ($O_a$) of at least 14% by weight, (b) bulk density according to ISO 3424 of at least 600 g/l, (c) abrasion index according to ISO 5937 of less than 8%, and (d) dissolution time in water at 15° C. of less than 2 minutes for 95% using 2 g/l.

The process according to the invention for producing sodium perborate monohydrate with the specified combination of properties is characterized by the fact that sodium perborate monohydrate particles smaller than those of the granulation to be made are produced by spraying aqueous sodium perborate solution into a fluidized bed at a bed temperature in the range of 40° to 95° C. and simultaneously evaporating water, whereby the sodium perborate solution to be sprayed is made by combining and mixing an aqueous hydrogen peroxide solution with an aqueous sodium metaborate solution and whereby the contact time between the combining of the solutions and the spraying is at least 2 seconds.

DETAILED DESCRIPTION OF THE INVENTION

Figure 1:
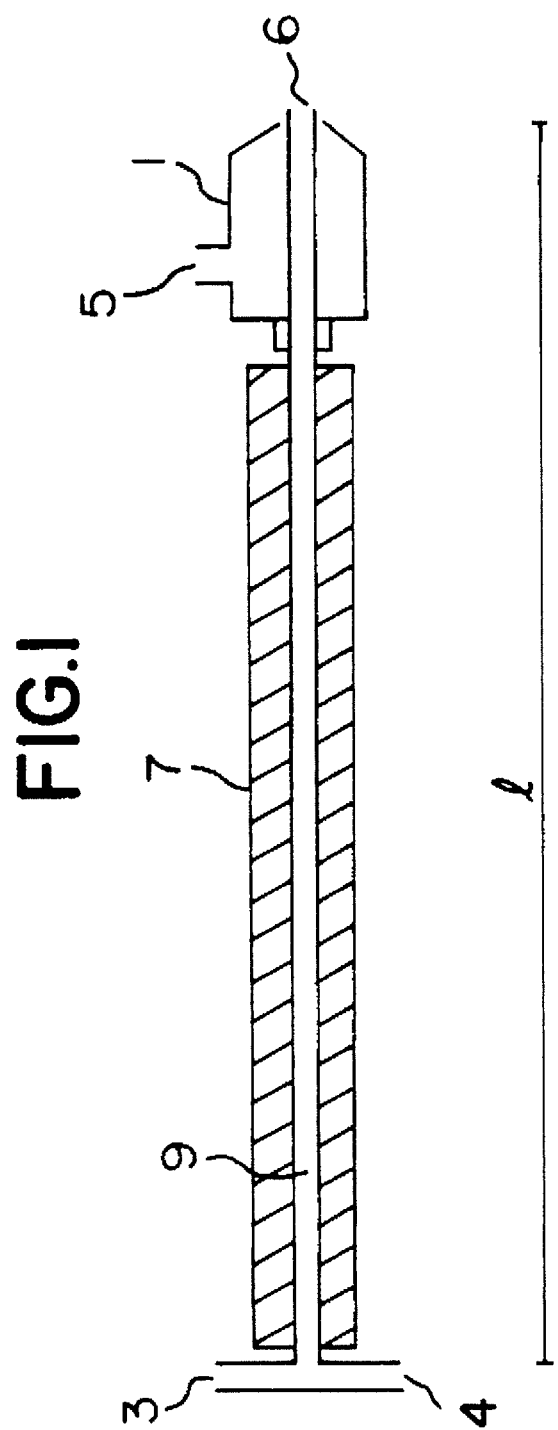
FIG. 1 shows a suitable embodiment of the spray nozzle used in the process of the invention.

By following the process of the invention, a sodium perborate monohydrate can be obtained with the properties listed below:

(a) an $O_a$ content of 15 to 16% by weight, (b) a bulk density of at least 700 g/l, (c) an abrasion index of less than 5%, and (d) a dissolution time of less than 2 minutes.

Surprisingly, products obtainable according to the invention have unexpectedly low specific surface in spite of their short dissolution time and high rate of solution. The specific surface (BET ($N_2$) according to DIN 66133) is less than 5 $m^2/g$, preferably less than 4 $m^2/g$. The BET determination is done on samples previously degassed in high vacuum at room temperature. The $O_a$ content of the monohydrate is usually 14 to 16%, preferably 15 to 16%.

The dissolution time is the time in which 95% of 2 g of the sodium perborate used per liter of water is dissolved at 15° C. This time is measured from the change in the electrical conductivity. An insulated glass measuring cell (D=90 mm, $H_1$=150 mm) is used for the determination. During the determination, the solution is stirred with a 4-vane stirrer at 340±5 revolutions per minute.

The bulk density according to the invention is greater than 600 g/l and preferably greater than 700 g/l. As a general rule it is between more than 700 g/l and 1000 g/l.

The processing principle is known from the German Patent No. 26 50 225. It is convenient to spray the solution using a two-material spray nozzle with air, preferably, as the blowing agent. A device for combining the solutions, designed so that the required contact time can be established, is connected ahead of the nozzle.

In FIG. 1, nozzle 1 is shown together with mixer 2 in the form of a mixing pipe. Feed connections 3 and 4 are for introducing the $H_2O_2$ solution and metaborate solution, respectively. Feed connection 5 at the nozzle is for introduction of the blowing gas, while the nozzle outlet 6 is for spraying. An insulating system 7 is for the mixing pipe.

The contact time can be established by the length (I) (the distance between the point of combining the solutions and the point where the perborate solution is released to the nozzle) and the rate of flow per unit time for a given cross-sectional area of the mixing pipe 2. If desired, the mixer can also be provided with static mixers. It is convenient for the mixing pipe to be insulated in order to avoid crystallization in the mixer, preferably to at least 40° C. mixing chambers connected ahead of the nozzle can also be used instead of the mixing pipe shown in FIG. 1.

The concentration of the sodium perborate solution to be sprayed can be from 5% to 60% by weight. In order to attain an even coating of the particles in the fluidized bed with sodium perborate, it is particularly convenient to spray a concentrated aqueous solution of sodium perborate, using a two-material nozzle with a mixing section connected ahead for mixing the treating components together upstream from the nozzle. Air is used as the blowing agent. The mass flows are selected so that the molar ratio of $NaBO_2$ to $H_2O_2$ is about 1 to 1. It is possible to use a slight deficiency or, preferably, excess of $H_2O_2$, up to about 10%. Reliable and homogeneous mixing of the solutions is accomplished by using the above-mentioned two-material nozzle with a mixing section connected ahead of it, that is, upstream therefrom. A crystallization inhibitor is not required. The fluidized bed temperature is preferably in the range between 50° and 70° C. The nuclei required, i.e., the particles which are smaller than those of the granulation, can be obtained by crystallization with subsequent dehydration in the aqueous phase. But it is also possible to use nuclei obtained by size-reduction, as by abrasion in the fluidized bed or by milling the granulation. It is desirable for the mass proportion of the granulation obtained by fluidized bed spray drying to be at least 50% by weight, and preferably more than 70% by weight.

The usual equipment for fluidized bed drying can be used to carry out the process, especially cylindrical or ring-shaped fluidized bed dryers provided with spray nozzles to spray the aqueous solution containing the covering components. The process can also be carried out in multi-zone ring-shaped fluidized bed driers such as are often used to dry sodium perborate tetrahydrate obtained by crystallization, or to dehydrate it. In this case the crystallized product is sprayed into the first zone and the drying is completed in the last zone.

Surprisingly, it has been found possible to establish the dissolution time by the deliberate adjustment of the contact time between the combination of the solutions used in the reaction and spraying. Combination of the solutions in or immediately ahead of the nozzle gives a product with an excessive dissolution time (low rate of dissolution). A contact time of at least two seconds, preferably at least 5 seconds, and especially at least 15 seconds, results in the product according to the invention. A contact time of more than 2 minutes is generally not necessary. The example shows contact time of 2 seconds to 120 seconds.

Through the process according to the invention it has become possible to obtain sodium perborate monohydrate having the desired properties without addition of surfactants.

The dissolution time in this case is considerably shorter than was previously attained using surfactants; i.e., less than 2 minutes at 15° C. in water for 95% of the added amount of 2 g/l.

EXAMPLES 1 AND 2

| Input | 1000 g sodium perborate monohydrate (0.2–0.3 mm fraction) (produced by dehydration of sodium perborate tetrahydrate) |
|---|---|
| Fluidized bed temperature: | 64–68° C. |
| Input air temperature: | 80–85° C. |
| Air flow: | 70–90 standard m³/hr |
| Nozzle air: | 1.5 bar, 3.7 std. m³/hr, 25° C. |
| Hydrogen peroxide solution: | 50% by weight 25° C. 165 g/hr metered in stabilized with 5.18 g/l $MgSO_4 \cdot 7 H_2O$ |
| Sodium metaborate solution: | 6 Mols/liter 40° C. 547 g/hr metered in |
| Molar ratio $H_2O_2/NaBO_2$: | 1.01 |
| Nozzle: | Two-material nozzle with preceding mixing section |
| Residence time (= contact time) in the mixing section: | 120 seconds |

| Product characteristics | Example 1 | Example 2 |
|---|---|---|
| Proportion of nuclei (%) | 51 | 35 |
| $O_a$ (%) | 15.3 | 15.1 |
| Bulk density (g/l) | 730 | 820 |
| Abrasion (%) | 3.1 | 2.8 |
| Dissolution time (seconds) | 39 | 54 |
| BET surface (m²/g) | — | 0.4 |
| Proportion 0.2–0.3 mm (%) | 17.0 | 4.0 |
| Proportion 0.3–0.4 mm (%) | 40.7 | 31.2 |
| Proportion 0.4–0.5 mm (%) | 21.6 | 28.4 |
| Proportion 0.5–0.6 mm (%) | 10.7 | 19.6 |

EXAMPLE 3

| Input: | 500 g sodium perborate monohydrate (0.2–0.3 mm fraction) |
|---|---|
| Fluidized bed temperature: | 60–65° C. |
| Input air temperature: | 71–84° C. |
| Air flow: | 50–70 standard m³/hr |
| Nozzle air: | 1.5 bar, 3.3 std. m³/hr, 25° C. |
| Hydrogen peroxide solution: | 50% by weight 25° C. 135.8 g/hr metered in stabilized with 5.18 g/l $MgSO_4 \cdot 7 H_2O$ |
| Sodium metaborate solution: | 6 Mols/liter 60° C. 464.1 g/hr metered in |
| Molar ratio $H_2O_2/NaBO_2$: | 1.00 |
| Nozzle: | Two-material nozzle with preceding mixing section |
| Residence time (= contact time) in the mixing section: | 60 seconds |

| Product characteristics | Example 3 |
|---|---|
| Proportion of nuclei (%) | 17 |
| $O_a$ (%) | 15.4 |
| Bulk density (g/l) | 845 |
| Abrasion (%) | 1.0 |
| Dissolution time (seconds) | 45 |
| BET surface (m²/g) | — |
| Proportion 0.2–0.3 mm (%) | 0.5 |
| Proportion 0.3–0.4 mm (%) | 15.5 |
| Proportion 0.4–0.5 mm (%) | 56.5 |
| Proportion 0.5–0.6 mm (%) | 17.0 |

EXAMPLE 4

| Input: | 500 g sodium perborate monohydrate (0.2–0.3 mm fraction) |
|---|---|
| Fluidized bed temperature: | 62–65° C. |
| Input air temperature: | 78–82° C. |
| Air flow: | 50–70 standard m³/hr |
| Nozzle air: | 1.5 bar, 3.3 std. m³/hr, 25° C. |
| Hydrogen peroxide solution: | 50% by weight 25° C. 96.8 g/hr metered in stabilized with 5.18 g/l $MgSO_4 \cdot 7\ H_2O$ |
| Sodium metaborate solution: | 6 Mols/liter 60° C. 314 g/hr metered in |
| Molar ratio $H_2O_2/NaBO_2$: | 1.03 |
| Nozzle: | Two-material nozzle with preceding mixing section |
| Residence time (= contact time) in the mixing section: | Two seconds |

| Product characteristics | Example 4 |
|---|---|
| Proportion of nuclei (%) | 42 |
| $O_a$ (%) | 15.3 |
| Bulk density (g/l) | 715 |
| Abrasion (%) | 7.2 |
| Dissolution time (seconds) | 98 |
| BET surface (m²/g) | 0.9 |
| Proportion 0.2–0.3 mm | 14.2 |
| Proportion 0.3–0.4 mm | 57.8 |
| Proportion 0.4–0.5 mm | 13.7 |
| Proportion 0.5–0.6 mm | 10.6 |

EXAMPLE 5 (NOT ACCORDING TO THE INVENTION)

| Input: | 500 g sodium perborate monohydrate (0.2–0.3 mm fraction) |
|---|---|
| Fluidized bed temperature: | 63–67° C. |
| Input air temperature: | 75–83° C. |
| Air flow: | 50–70 standard m³/hr |
| Nozzle air: | 1.5 bar, 3.4 std. m³/hr, 25° C. |
| Hydrogen peroxide solution: | 50% by weight 25° C. 92.4 g/hr metered in stabilized with 5.18 g/l $MgSO_4 \cdot 7\ H_2O$ |
| Sodium metaborate solution: | 6 Mols/liter 60° C. 303 g/hr metered in |
| Molar ratio $H_2O_2/NaBO_2$: | 1.02 |
| Nozzle: | Two-material nozzle with preceding mixing section |
| Residence time (= contact in the mixing section: | <1 second |

| Product characteristics | Example 5 |
|---|---|
| Proportion of nuclei (%) | 23 |
| $O_a$ (%) | 15.5 |
| Bulk density (g/l) | 816 |
| Abrasion (%) | 5.2 |
| Dissolution time (seconds) | 132 |
| BET surface (m²/g) | — |
| Proportion 0.2–0.3 mm (%) | 26.4 |
| Proportion 0.3–0.4 mm (%) | 33.7 |
| Proportion 0.4–0.5 mm (%) | 20.8 |
| Proportion 0.5–0.6 mm (%) | 13.8 |

Further variations and modifications of the foregoing will be apparent to those skilled in the art and are intended to be encompassed by the claims appended hereto.

German Priority Application No. 195 16 609.4 is relied on and incorporated by reference herein.

We claim:

1. A process for producing sodium perborate monohydrate in the form of granulates with the combination of properties:

(a) active oxygen content ($O_a$) of at least 14% by weight;
(b) bulk density according to ISO 3424 of at least 600 g/l;
(c) abrasion index according to ISO 5937 of less than 8%; and
(d) dissolution time of less than 2 minutes at 15° C. in water for 95% of an added amount of 2 g/l, comprising spraying sodium perborate monohydrate particles smaller than those of the granulates to be produced with an aqueous sodium perborate solution into a fluidized bed at a fluidized bed temperature in the range of 40° to 95° C.;

simultaneously evaporating water; and wherein the sodium perborate solution used for spraying is produced by combining and mixing an aqueous hydrogen peroxide solution with an aqueous sodium metaborate solution for a contact time of at least 2 seconds to produce a spraying mixture, and then spraying said particles with said spraying mixture.

2. The process according to claim 1, wherein said contact time is 15 to 120 seconds.

3. The process according to claim 1, wherein the concentration of the sodium perborate spraying mixture is 5 to 60% by weight.

4. The process according to claim 1 wherein said sodium perborate monohydrate has an active oxygen content of 14 to 16% by weight.

5. A process for producing sodium perborate monohydrate in granulate form, comprising spraying of sodium perborate monohydrate particles smaller than those of the granules to be produced with an aqueous sodium perborate solution in a fluidized bed at a fluidized bed temperature in the range of 40° to 95° C. and, simultaneously evaporating water, wherein the sodium perborate solution is produced before spraying by combining and mixing an aqueous hydrogen peroxide solution for a contact time of at least 2 seconds with an aqueous sodium metaborate solution to produce a spraying mixture, and then contacting said particles with said spraying mixture for a contact time of at least 2 seconds.

6. The process according to claim 5, wherein said contact time is at least 15 seconds.

7. The process according to claim 5, wherein the concentration of the sodium perborate spraying mixture is 5 to 60% by weight.

8. The process according to claim 5, wherein the molar ratio of $NaBO_2$ to $H_2O_2$ is about 1:1.

9. The process according to claim 5, wherein the fluidized bed temperature is in the range of 50° to 70° C.

10. The process according to claim 5, which is free of a crystallization inhibitor.

11. The process according to claim 5, wherein the spraying mixture is free of surfactants.

12. The process according to claim 5, wherein the contact time is from 2 seconds to 120 seconds.

13. A process for producing sodium perborate monohydrate in the form of granulates having the following properties:

(a) active oxygen content ($O_a$) of at least 14% by weight;
(b) bulk density according to ISO 3424 of at least 600 g/l;
(c) abrasion index according to ISO 5937 of less than 8%; and
(d) dissolution time of less than 2 minutes at 15° C. in water for 95% of an added amount of 2 g/l, comprising combining and mixing an aqueous hydrogen peroxide solution with an aqueous sodium metaborate solution for a contact time of at least 2 seconds prior to spraying, then spraying sodium perborate monohydrate particles smaller than those of the granulates to be produced with said aqueous sodium perborate solution in a fluidized bed at a fluidized bed temperature in the range of 40° to 95° C.;

simultaneously evaporating water; and recovering the sodium perborate monohydrate granulates.

* * * * *